Nov. 14, 1961 A. M. BERNSTEIN 3,008,393
LETTERING CAMERA
Filed April 9, 1959 5 Sheets-Sheet 1
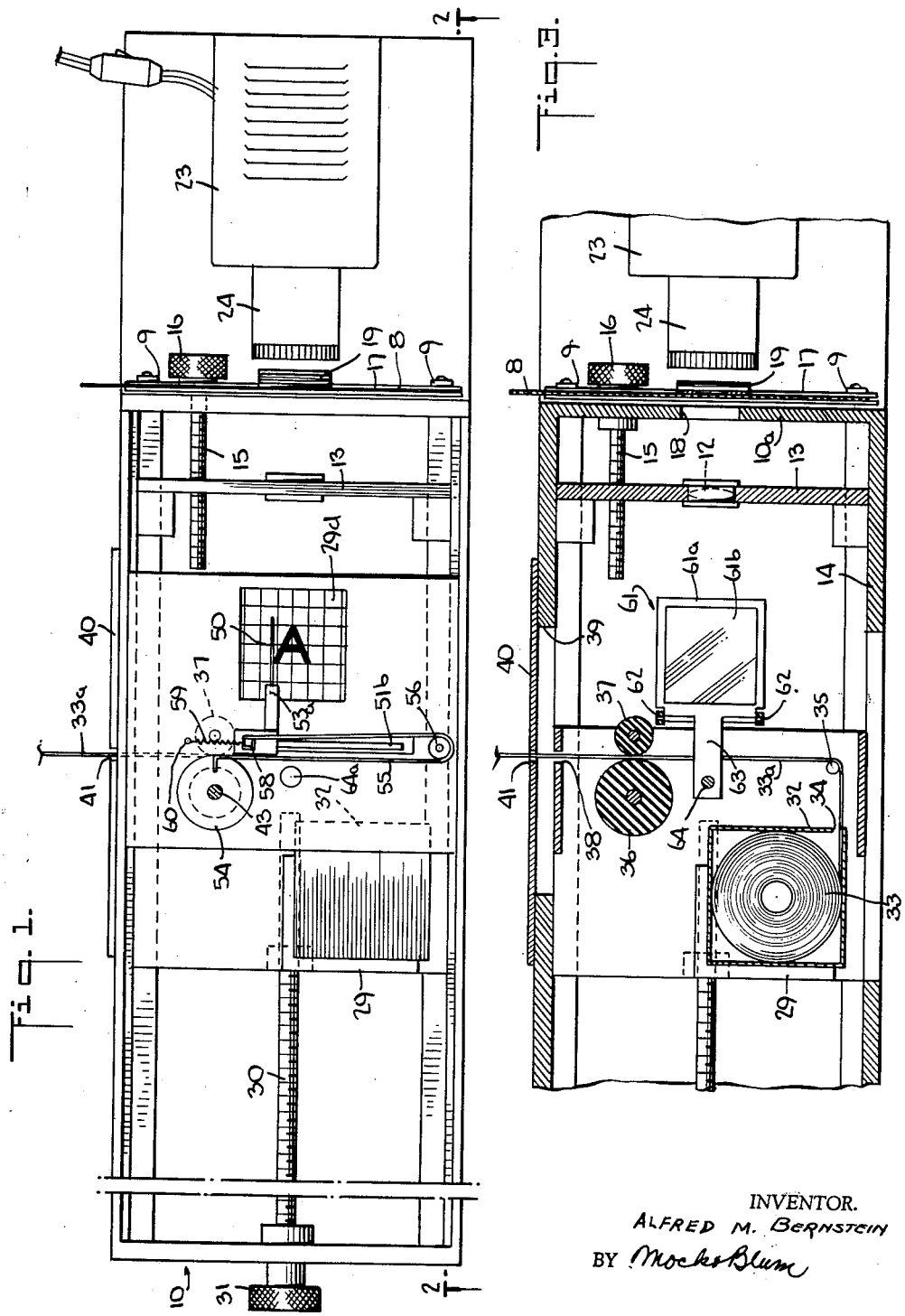
INVENTOR.
ALFRED M. BERNSTEIN
BY Mocks Blum
ATTORNEYS Nov. 14, 1961 A. M. BERNSTEIN 3,008,393
LETTERING CAMERA
Filed April 9, 1959 5 Sheets-Sheet 2
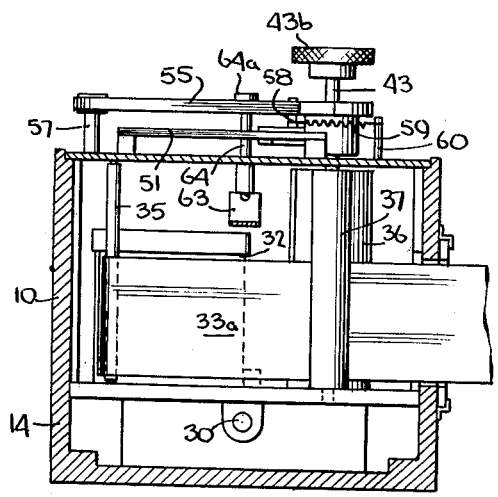
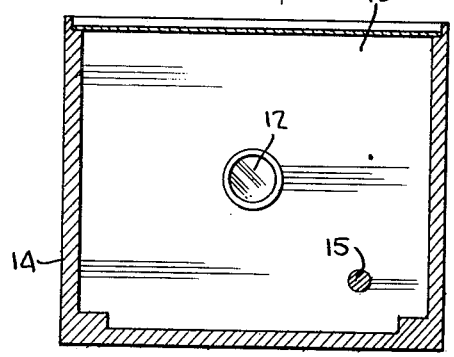
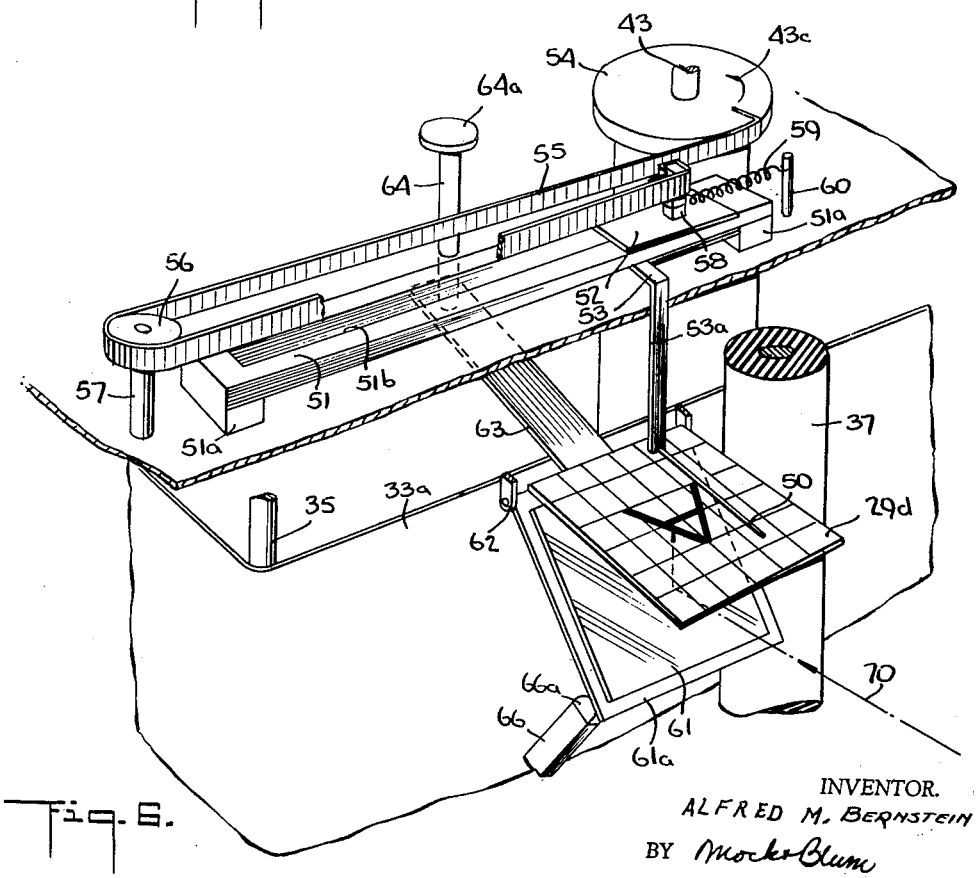
INVENTOR.
ALFRED M. BERNSTEIN
BY Mocks-Blum
ATTORNEYS

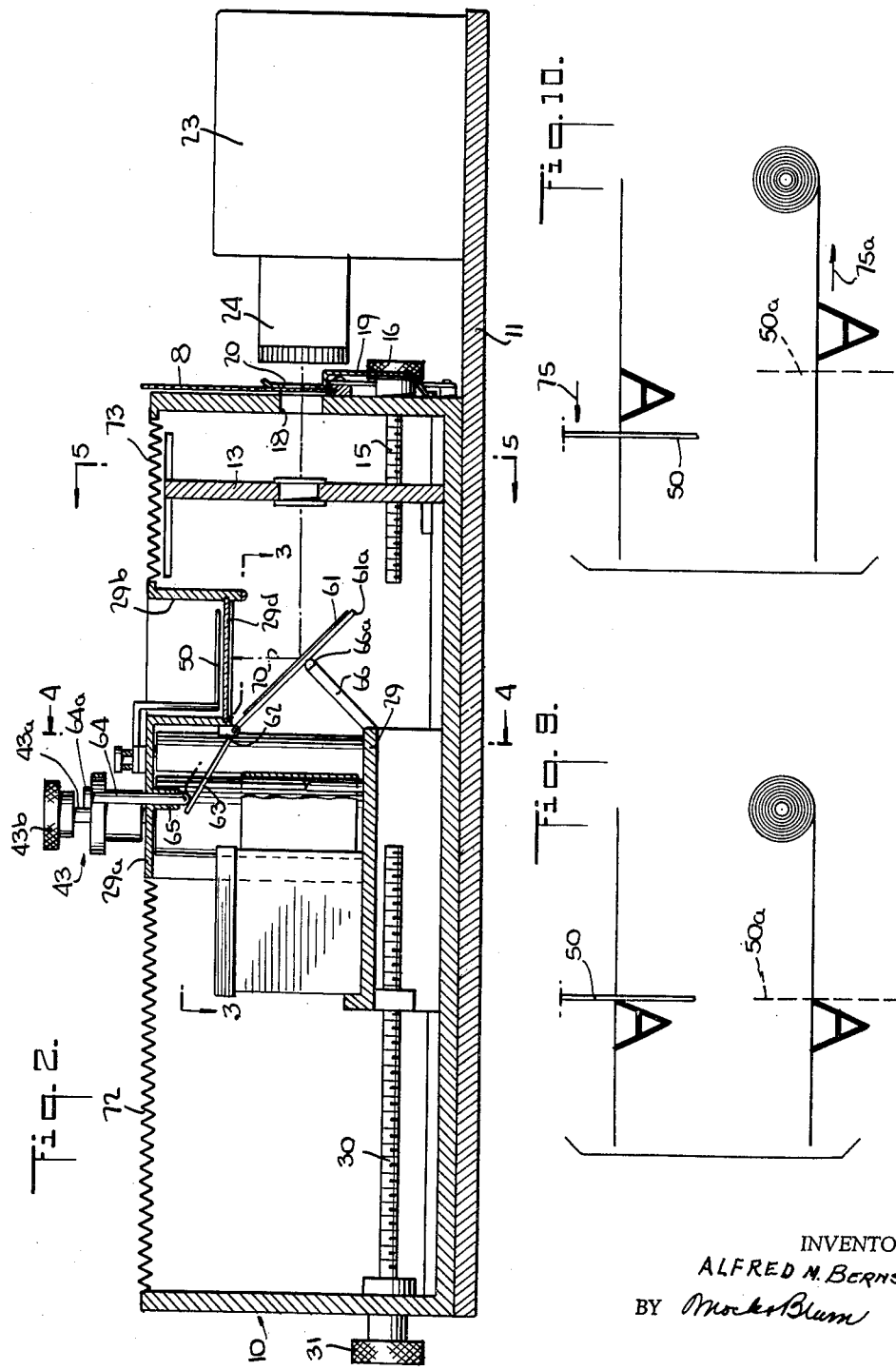

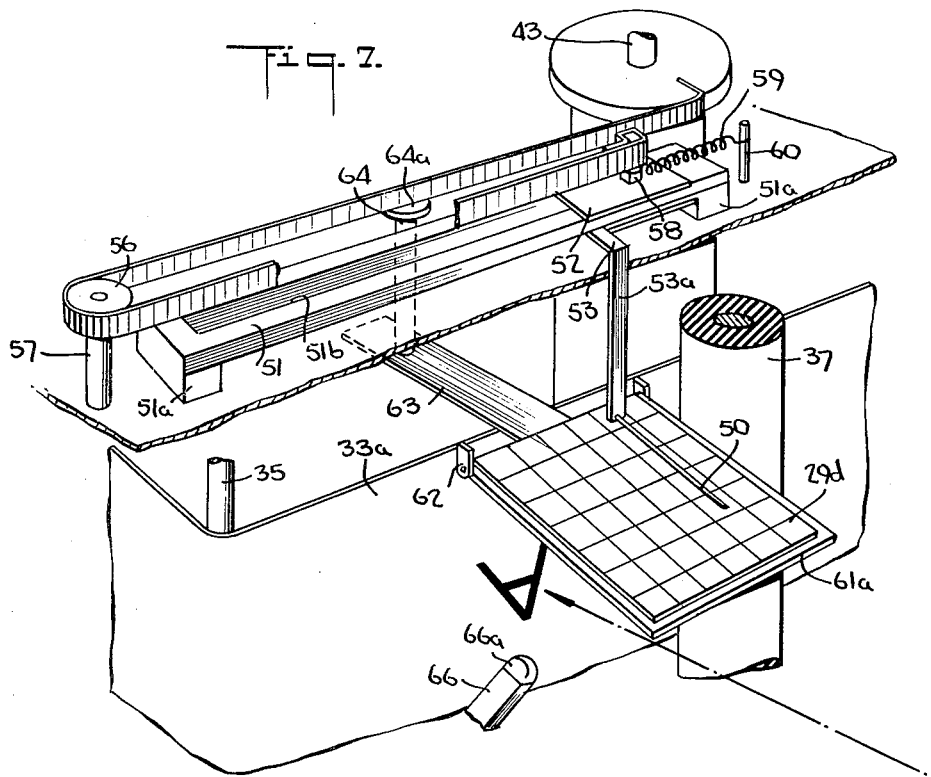

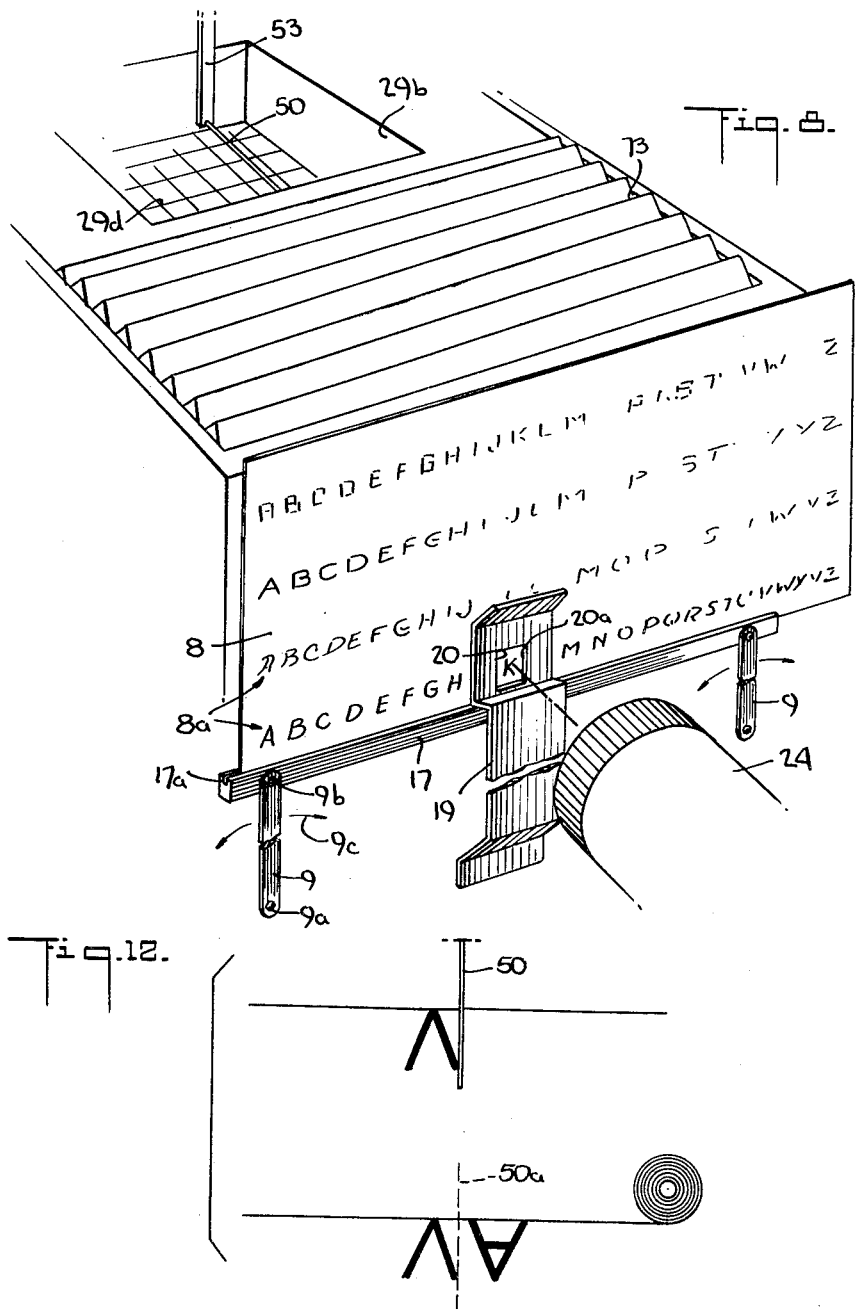

United States Patent Office 3,008,393
Patented Nov. 14, 1961

3,008,393
LETTERING CAMERA
Alfred M. Bernstein, 20—34 Sea Girt Blvd.,
Far Rockaway, N.Y.
Filed Apr. 9, 1959, Ser. No. 805,214
2 Claims. (Cl. 95—4.5)

This invention relates to improvements in photographic lettering cameras.

In cameras of this type, the image of a letter is projected, by means of an enlarging or reducing camera, upon sensitized paper, so as to photograph the enlarged or reduced image of the letter. In this way, by successively exposing different letters, words having letters of desired size, shape and spacing may be economically and easily made up, this process being of particularly importance in the production of advertising material.

In order to vary the spacing of the enlarged letters, it is necessary to move the sensitized paper a selected amount between exposures of successive letters. The amount of movement of the paper depends upon the projected size of the letters, as well as upon the desired spacing between the projected letters.

An important object of this invention is to provide improved means for determining and indicating the movement of sensitized paper which is necessary to produce the desired spacing between the projected letters, which means will be accurate regardless of the extent of magnification of font letters.

In accordance with a preferred embodiment of the invention, when a letter is placed in position for projection of its image upon the sensitized paper, and prior to taking the picture, the image of the letter is projected upon an externally visible translucent plate.

As an important feature of the invention, this translucent plate is mounted for forward and rearward movement in unison with the sensitized paper when the size and focus of the image are being adjusted, thereby ensuring that the image of the letter upon the translucent plate will be identical to the image to be projected upon the sensitized paper.

As another important feature of the invention, the means for projecting the image of the font upon the translucent plate also serve as a shutter for controlling the projection of the image upon the sensitized paper.

As another important feature of the invention, a hairline is mounted above the translucent plate in proximity thereto and is adapted to be moved laterally across the surface thereof so as to vary the location of the hairline relative to the image of the font letter upon the translucent plate. Means are provided for simultaneously moving the sensitized paper and the hairline laterally, after exposure of the sensitized paper to the image of the font letter, the magnitude of the movement of the sensitized paper and of the hairline being identical. In this way, the desired spacing of the font letters may be selected and determined visually. The means for moving the hairline and the sensitized paper include clutch means and spring return means for automatic return of the hairline to its initial position, upon release of the moving means, while the sensitized paper is at the same time prevented from moving backwards.

Other objects and advantages of the invention will become apparent from the following description, in conjunction with the annexed drawings, in which preferred embodiments of my invention are disclosed.

In the drawings,

FIG. 1 is a top plan view of my improved apparatus with the top wall of the camera removed.

FIG. 2 is a section on line 2—2 of FIG. 1.

FIG. 3 is a fragmentary section on line 3—3 of FIG. 2.

FIG. 4 is a section on line 4—4 of FIG. 2.

FIG. 5 is a section on line 5—5 of FIG. 2.

FIG. 6 is a fragmentary perspective view of the apparatus, with the cover broken away, showing a letter being projected for viewing.

FIG. 7 is a view similar to FIG. 6, with the apparatus inactive.

FIG. 8 is an enlarged fragmentary perspective view of a portion of the apparatus.

FIGS. 9–12, inclusive, are diagrammatical views showing successive steps in the operation of the apparatus.

Upon reference to the drawings in detail, it will be noted that they show a housing 10 of generally rectangular shape. This housing 10 rests upon a platform 11 which extends beyond one end of the housing, this end being taken as the front end of the housing.

The housing is elongated in its front to rear or longitudinal direction. Lens 12 is mounted upon a plate-like bracket 13 which extends transversely to the axis of housing 10 and which is located near the front thereof. Lens 12 is mounted by any suitable means in a central opening of bracket 13. The bottom of bracket 13 is received by any suitable means on a tracking device 14 so as to be longitudinally movable. Adjusting screw 15 extends longitudinally through a suitable threaded opening in bracket 13 and also extends through housing 10 to the front thereof, with knob 16 mounted upon the front end of said screw 15. Accordingly, by turning knob 16, it is possible to move lens 12 in either longitudinal direction, in a manner which is well known in the art.

The front wall of housing 10 is provided with an aperture 18 which is in opposition to and in longitudinal alinement with lens 12.

Font bracket 17 is mounted in horizontal position upon the front face of housing front wall 10a by means of bar links 9. Bracket 17 extends laterally and is elongated and has a lateral channel 17a in its upper face. Each link 9 is connected at its upper end to a respective end portion of bracket 17 by means of longitudinal pivot 9b. Link 9 is connected at its lower end to wall 10a by means of longitudinal pivot 9a. As shown in FIG. 8, links 9 are parallel to each other; and by swinging them in the direction of arrow 9c, bracket 17 may be raised and lowered while remaining horizontal.

Font plate 8 is transparent and is adapted to be laterally slidably received within channel 17a. Font plate 8 is optionally rectangular and has a series of fonts 8a thereon. Each font 8a has its components (such as letters) disposed in a horizontal row. It will be apparent that any selected letter of any selected font 8a may be disposed opposite aperture 18. Aperture 18 is preferably at least as large as the largest font letter.

A vertically extending, elongated spring clip 19 is mounted upon the front of housing 10 by any suitable means, below opening 18 and below bracket 17. This spring clip 19 extends upwardly and bears frictionally against font plate 8. Clip 19 overlies opening 18 and has an opening 20 registering longitudinally with and of the same size as opening 18. This opening 20 is adapted to frame each of the letters of the font in the manner shown in FIG. 8.

Any suitable light source 23, which is not shown in detail, may be mounted upon platform 11 in front of housing 10. This light source 23 has a lens system whose outer housing is designated by the reference numeral 24 and which faces and opposes opening 18. The light is directed from light source 23 through opening 20, font 8, aperture 18 and lens 12 in a rearward direction.

A carriage 29, for support of sensitized paper, is mounted upon housing 10 at the bottom wall thereof so as to be longitudinally slidable.

Carriage 29 is slidable between the rear portion of housing 10 and the front portion of housing 10, as is clearly shown in FIG. 2 and in other views. A longitudinal adjusting screw 30 extends through a threaded recess in carriage 29 and also extends rearwardly thereof and through a recess in the rear wall of housing 10. Knob 31 is mounted upon screw 30 rearwardly of housing 10. It will be apparent that by turning knob 31, the longitudinal position of carriage 29 may be adjusted.

A box 32 is mounted upon carriage 29 adjacent thereof and adjacent the left side thereof, as viewed from the front of the apparatus. A roll of sensitized photographic paper 33 may be removably located within box 32, so as to be turnable about a vertical axis in a counter-clockwise direction, as viewed from above, for drawing paper from the roll. The drawn paper extends through a vertical slit 34 in the front wall of box 32, adjacent the left side thereof.

The drawn end 33a of the paper is extended around a vertically disposed idler roller 35 located in front of slit 34. The paper end 33a is extended laterally from the roller 35 across the housing 10 to the right side thereof. Said drawn paper end 33a extends frictionally between a rear pressure roller 36 of relatively large diameter and a front pressure roller 37 of relatively smaller diameter.

Rollers 36 and 37 are turnable about vertical axes and are mounted on carriage 29 adjacent the right side of housing 10. Said drawn paper end 33a further extends through a vertical slit 38 in a vertical wall 38a on the right side of carriage 29 and extends through an opening 39 in the right side of housing 10. This opening 39 is protected by a light baffle 40 having a further slit 41 through which the paper extends. To the left of rollers 36 and 37, the drawn paper is located in a vertically and laterally extending plane in position to be struck by the incident light passing through lens 12.

The top of housing 10 does not have a rigid wall. However, carriage 29 does have a horizontal top wall 29a which is on a level with the top of housing 10, and which carries certain operating parts of the apparatus.

The upper ends of rollers 36, 37 and 35 are journalled in said plate 29a. In addition, the shaft of roller 36 extends above wall 29a and a one-way clutch mechanism 43 is mounted upon the shaft of pressure roller 36. Said clutch mechanism 43 may be of any suitable nature and is not described in detail. Said clutch mechanism 43 has an upstanding operating shaft 43a upon which operating knob 43b is mounted. As indicated by arrow 43c in FIG. 6, pressure roller 36 may be turned in a counter-clockwise direction, as viewed from the top, so as to draw paper end 33a to the right. In the well known manner, when the clutch mechanism is released, the paper is not moved in the reverse direction.

Wall 29a extends forwardly of the main portion of carriage 29 and is provided at its front end with a square depressed recess portion 29b, the shape of which is clearly shown in FIGS. 1 and 2. The bottom of recess 29b is open and a translucent plate 29d is horizontally disposed within the bottom of recess 29b, by any suitable means. This plate 29d is optionally and preferably ruled in graph form, for instance by longitudinally and laterally extending lines, as is clearly shown in FIGS. 1, 6 and 7. As an important feature of the invention, an indicating hairline member 50 is coupled to the one-way clutch mechanism 43 for movement relative to plate 29d. To accomplish this purpose, a laterally extending elongated guide member 51 is fixed to the top of wall 29a by means of end feet 51a which hold guide member 51 spaced above wall 29a. This guide member 51 has a laterally extending slot 51b.

A block 52 rests upon guide 51 and has a depending portion extending laterally slidably within slot 51b. The guide 51 is located behind recess 29b. Arm 53 is fixed to block 52 at the bottom thereof and extends under guide 51 to a point above the rear portion of plate 29d.

At its front end, arm 53 has a depending leg 53a which extends to a point just above plate 29d. The hairline member 50 is fixed to the lower end of leg 53a and extends longitudinally forwardly thereof. In order to move block 52 laterally, clutch member 43 is provided with a reel 54, of the same diameter as pressure roller 36, mounted on shaft 43 and carrying a roll of tape 55. This tape 55 is carried laterally across the top of the apparatus, to the left of reel 54, and hence around and in front of pulley 56 which is turnably mounted upon a vertical stub shaft 57 which is fixed to the top of plate 29a.

The tape 55 is then carried to the right of pulley 56 and its free end is secured to a post 58. This post is fixed to and extends upwardly from slide block 52. One end of return spring 59 is fixed to post 58. Return spring 59 extends to the right of post 58 and has its other end fixed to a post 60 which extends upwardly and is fixed to wall 29a to the right of guide member 51.

It will be apparent that when knob 43b is turned so as to draw the sensitized paper to the right, the hairline 50 is moved to the left. The clutch mechanism is such that when knob 43b is released, the paper does not move, but spring 59 returns hairline 50 to its original position.

As another important feature of the invention, a shutter is provided which also serves to direct the image of the font letter upwardly through plate 29d prior to photographing the font letter. The shutter is in the form of a square mirror 61 having the usual frame 61a and the usual reflecting surface 61b on its upper face. Said mirror 61 is disposed generally under plate 29d and is connected at its rear end by horizontal pivots to ears 62 fixed to the lower rear edge of the rear wall 29b.

A lever 63 is fixed to the rear of mirror 61 and extends rearwardly thereof. A plunger 64 having a head 64a extends slidably downwardly through a bore in a depending boss 65 formed on wall 29a. The lower end of plunger 64 rests against the upper rear of lever 63.

A stop 66 having a rubber tip 66a extends upwardly and forwardly from the front edge of the base of carriage 29, at approximately 45 degrees to the horizontal. In the lower position of mirror 61, which is its normal position, the rear face of mirror frame 61a rests against stop tip 66a, and mirror 61 is upwardly inclined from front to rear at an angle of 45 degrees with the horizontal. Accordingly, as shown by arrow 70 in FIGS. 2 and 6, in the normal rest position of mirror 61, incident light from light source 23, which passes through lens 12, strikes reflecting surface 61b and is reflected upwardly through plate 29d, which of course can be viewed from the top. The shutter mirror 61 at the same time prevents the incident light from striking the sensitized paper end 33a which is disposed behind mirror 61 and just below the pivot ears 62. On the other hand, when plunger 64 is depressed, as shown in FIG. 7, mirror 61 is raised and blocks off light from entering the housing 10 through plate 29d and at the same time permits incident light to travel in the direction of arrow 71 and project an image upon the paper end portion 33a.

The top of housing 10 may be sealed from the passage of unwanted light by any suitable means. Optionally, a flat bellows 72 extends between the rear of wall 29a and also between the sides and rear of housing 10, and is longitudinally compressible and expandable. A similar bellows 73 extends between the front of plate 29a and the front of housing 10 and between the sides thereof.

In the operation of the apparatus, the desired letter of the font is brought into registration with opening 20, with the image of the right edge of the letter at the hairline 50. In its normal position, hairline 50 is longitudinally positioned to indicate a starting point. Such letter is illustratively shown in FIGS. 9–12 as the letter "A." With mirror 61 in its normal position, the image of letter "A" is projected through the translucent plate 29d, directly to the left of hairline 50. This is clearly shown in the upper exploded view of FIG. 11.

It is possible by adjustment of knobs 16 and 31 to vary the size and adjust the focus of the letter which will be projected upon the sensitized paper end 33a, in a manner which is well known to those skilled in the photographic art. At the same time, in view of the fact that plate 29d moves in unison with carriage 29, the operator can be certain that the image of the letter "A" on translucent plate 29d will correspond in size to the image which is to be projected upon the sensitized paper end 33a.

Appropriate means (not shown) may optionally be provided for initially adjusting the position of the letter image "A," to the left or right, as necessary, in order to compensate for the particular size of the image of the letter "A." The lower exploded view of FIG. 9 shows the corresponding image of the letter "A" upon the sensitized paper end 33a, the broken line 50a being merely an imaginary reference line to show the position of the image of letter "A" on the sensitized paper corresponding laterally to the position of hairline 50.

Plunger head 64a is then depressed, so that the sensitized paper 33 is exposed to the image of letter "A." As shown in FIG. 10, the one-way clutch mechanism is then manipulated, by turning knob 43b, so as to move hairline 50 to the left, in the direction of arrow 75, and so as to move the sensitized paper end 33a to the right, as indicated by arrow 75a. The reference line 50a in FIG. 10 indicates the starting position of hairline 50, relative to the sensitized paper end 33a. It will be understood that since the font has not been moved, the image of letter "A" upon plate 29d remains unchanged in FIG. 10 as compared with FIG. 9.

As is also shown in FIG. 10, the movement of the one-way clutch is continued so as to carry hairline 50 a selected distance to the left of the image of letter "A," which corresponds to the desired spacing between the letter "A" and the next letter of the font which is to be photographed.

The lower portion of FIG. 10 shows the corresponding displacement on the sensitized paper of the image of letter "A" relative to reference line 50a.

As shown in FIG. 11, upon release of the one-way clutch mechanism, hairline 50 returns to its starting position of FIG. 9 relative to the image of letter "A" upon translucent plate 29d. However, the image of letter "A" upon the sensitized paper end 33a remains displaced the same distance to the right of reference line 50a as in FIG. 10.

As shown in FIG. 12, the font may then be slid so as to bring another letter into registration with aperture 20, such letter being shown illustratively as the letter "V." In the upper part of FIG. 12, the image of letter "V" on plate 29d is shown as having the same relationship to hairline 50 as was the case with letter "A" in FIG. 9. However, on the sensitized paper end 33a, the images of the letters "A" and "V" are displaced in accordance with the spacing selected and the steps shown in FIG. 10.

While I have disclosed a preferred embodiment of my invention, and have indicated various changes, omissions and additions which may be made therein, it will become apparent that various other changes, omissions and additions may be made therein, without departing from the scope and spirit thereof.

I claim:

1. In a lettering camera and the like comprising a lens, a film-holding and transport mechanism adapted to hold the film in longitudinally spaced opposition to said lens with said film extending laterally and vertically and adapted to index said film laterally in selected direction, said mechanism including operator-controlled means for determining the length of the indexing movement, means for projecting images of selected letters through said lens and upon said film, an image viewer, and means for projecting at selected location on said viewer an image corresponding in size and appearance to the image projected upon the film; improvement in film indexing gauge means for use by the operator in determining the distance of indexing the film so as to control the spacing between successive letter images on the film, said improvement comprising a reference member, means mounting said reference member against said viewer in normal selected initial position in which said reference member is offset from said image and extends in a direction parallel to the axis of said image and is located adjacent the side of said image which is in the direction of indexing movement of said film, said reference member being movable relative to said image in translatory direction crosswise of the axis of said image so as to cross said image, means coupling said reference member and said film transport means for automatically moving said reference member in said translatory direction across said viewing plate image when said film is moved, said reference member being moved a distance corresponding to the distance of movement of said film and means coupling said reference member and said film transport means for automatically returning said reference member to its initial position when the film stops moving.

2. In a lettering camera and the like of the type described having film transport means and having a viewing plate upon which there is projected an image corresponding to the image projected upon the film, improvement in film indexing gauge means for use by the operator in determining the extent to which to index the film so as to control the spacing between successive images on the film, said improvement comprising a reference member in the form of a hairline and the like, means mounting said hairline so that it is parallel to the axis of said image and is movable in translatory direction across said image, said hairline having a normal selected initial position in which it is located outside of said image and adjacent the side thereof which is in the direction of indexing movement of said film, means coupling said hairline and said film transport means for automatically moving said hairline in translatory direction across the viewing plate image when the film is moved, said hairline being moved a distance corresponding to the distance of movement of said film, and means coupling said hairline and said film transport means for automatically returning said hairline to its initial position when the film stops.

References Cited in the file of this patent

UNITED STATES PATENTS

| | | |
|---|---|---|
| 1,893,439 | Ogden | Jan. 3, 1933 |
| 2,160,750 | Meyer | May 30, 1939 |
| 2,780,151 | Borisof | Feb. 5, 1957 |
| 2,791,162 | Snyder | May 7, 1957 |